Patented June 13, 1939

2,162,373

UNITED STATES PATENT OFFICE 2,162,373

CATALYTIC POLYMERIZATION OF ACETYLENE

Albert S. Carter, Wilmington, and Howard W. Starkweather, New Castle County, Del., assignors to E. I. du Pont de Nemours & Company, Wilmington, Del., a corporation of Delaware No Drawing. Application July 2, 1937, Serial No. 151,644

6 Claims. (Cl. 260—678)

This invention relates to the manufacture of nonbenzenoid acetylene polymers. More particularly it relates to a process for the manufacture of vinylacetylene from acetylene, and still more particularly, to a catalyst especially adapted to the manufacture of monovinylacetylene.

In United States Patent 1,811,959, issued June 30, 1931, to Julius A. Nieuwland is described a process for the polymerization of acetylene in the presence of aqueous solutions of cuprous salts. In a subsequent patent to Carter and Downing, (United States Patent No. 2,048,838, issued July 28, 1936), special conditions and technique of operation were described to provide a method of producing monovinylacetylene in high yields. In this prior art, it was shown that an aqueous solution of cuprous chloride and ammonium chloride would polymerize acetylene to a mixture of monovinylacetylene and divinylacetylene; it was further stated that temperatures up to 100° C. could be satisfactorily used.

In the prior art processes, composition of catalyst and other conditions remaining the same, increase in temperature to an optimum value below 100° C. has resulted in an increase in the production of acetylene polymers. However, increase in temperature also resulted in an increase in the proportion of higher polymers to monovinylacetylene; i. e., with fixed catalyst composition and reaction conditions per unit amount of acetylene polymerized, increase in temperature resulted in a decrease in the yield of monovinylacetylene. While polymerization at the lower temperatures is more efficient with respect to yield of monovinylacetylene, it is inefficient in that production per unit of time and per unit of catalyst is lower. The production of polymers and the yield of monovinylacetylene vary with catalyst composition but all prior art catalysts show the temperature effect described. The prior art processes have been necessarily carried out under conditions which represented a compromise between those favoring high polymer production and those favoring high yield of monovinylacetylene.

It is an object of this invention to carry out the polymerization of acetylene to nonbenzenoid polymers thereof under more efficient operating conditions than have heretofore been known or used. It is a further object of the invention to polymerize acetylene in the presence of a catalyst composition which gives maximum operating efficiency, having due regard for both polymer production and monovinylacetylene yield. A still further object is to provide a catalyst composition which gives good monovinylacetylene yield under conditions promoting high polymer production. Further objects will appear hereinafter.

These objects have been accomplished by providing a novel catalyst composition comprising ammonium chloride and cuprous chloride ($Cu_2Cl_2$) in approximately the molecular proportions of 2 to 1 in water, and polymerizing acetylene in the presence of this catalyst. It has been found that, as in the case of prior catalyst compositions, the polymer production increases with increase in temperature. Unlike the prior art, the yield of monovinylacetylene by polymerization of acetylene, in the presence of this novel catalyst is unexpectedly practically unaffected by temperature variation within the range of good polymer production. Since divinylacetylene is the principal by-product, it is convenient to express all of the higher polymers as divinylacetylene, although the products other than divinylacetylene may amount to as high as 15% of the total by-products. With all of the by-products expressed as divinylacetylene, the ratio of monovinylacetylene to by-products may be called the "MVA/DVA ratio". This term will be so used hereinafter. Using this terminology, the above advantages of the new catalyst composition may be restated by saying that the MVA/DVA ratio of the products of polymerization of acetylene in the presence of the new catalyst in the temperature range of good polymer production is substantially unaffected by temperature. This means that the process can be carried out at the temperature which favors high polymer production while retaining the advantages of high monovinylacetylene yield.

The advantages of the new catalyst composition may be illustrated by a comparison with prior art catalysts. Thus, applying the technique described by Carter and Downing (United States Patent No. 2,048,838) using a catalyst composed of 1340 gms. cuprous chloride, 515 gms. ammonium chloride, 40 gms. 37% hydrochloric acid and 575 gms. of water, operated in a 4500 cc. catalyst tube, horizontally agitated at 180 R. P. M., and possessing a tube length of 37.2 cm. and diameter of 12.4 cm., acetylene was introduced at a speed to permit a 23 second contact time in the catalyst chamber. The effect of temperature is shown by the data of Table I.

*Table I*

| Temperature, °C. | Conversion $C_2H_2$ to MVA | $\dfrac{MVA}{DVA}$ ratio* |
|---|---|---|
| | Percent | |
| 50 | 7.6 | 12 |
| 65 | 12.9 | 10 |
| 75 | 14.5 | 8.8 |

*In these ratios, DVA is taken to include all products other than monovinylacetylene.

It will be observed that this catalyst contains a ratio of ammonium to cuprous chloride approximating $3Cu_2Cl_2.4NH_4Cl$ and that this composition is not completely dissolved at the 50° C. operating temperature. With this catalyst, the results are typical of the prior art catalysts; e. g., with increased temperature, increased conversion and decreased MVA/DVA ratio. It has now been found, however, that a catalyst, approaching a composition $Cu_2Cl_2.2NH_4Cl$ may have a slightly lower conversion efficiency at any chosen temperature, but the MVA/DVA ratio will be superior, showing a much reduced temperature coefficient. The results with such a catalyst are shown in Table II. In this case, operation was carried out exactly as before, but the catalyst was composed of 1110 gms. $Cu_2Cl_2$, 545 gms. $NH_4Cl$, 830 gms. $H_2O$ and 42 gms. 37% $HCl$.

Table II

| Temperature, °C. | Conversion $C_2H_2$ to MVA | $\frac{MVA}{DVA}$ ratio* |
|---|---|---|
| | Percent | |
| 50 | 7.2 | 14.4 |
| 65 | 12.8 | 14 |
| 75 | 14.2 | 14.3 |

*DVA, as in Table I, includes all products other than monovinyl acetylene.

As will be seen from a comparison of the data of Table I with Table II for the same temperature and conversion, the MVA/DVA ratio is substantially better and only slightly affected by temperature in the case of the new catalyst. This discovery of a catalyst wherein there is practically no variation in the MVA/DVA ratio with change of temperature is unexpected. This catalyst has the advantage that the temperature range favoring the greatest gross production may be used without disturbing the MVA/DVA ratio.

With regard to the operation and general composition of the catalyst of this invention, one essential improvement in operating technique is that it will be possible to carry the reaction temperature above 50° C. and obtain equal or superior yields to those previously obtained at 50° C. It is preferred that this catalyst be used in a continuous process such as that of Carter and Downing (loc. cit.). In this process, the acetylene stream contacts the agitated catalyst, the gases leaving the reaction chamber are partially condensed and fractionated, the products of reaction are removed, and the unreacted acetylene is recirculated to the reaction chamber. Any gas velocity may be used which is sufficient to carry off the products of the reaction. It is preferred that the gas velocity be high enough to remove the products before a substantial amount of divinylacetylene is formed. While the continuous process of Carter and Downing is recommended, the new catalyst is likewise effective in other processes for producing nonbenzenoid polymers of acetylene and in batch as well as continuous reactions.

The catalyst comprises cuprous chloride, ammonium chloride and water with or without the addition of hydrochloric acid and metallic copper as desired. It has been found that the operation is most satisfactory when the composition of the catalyst includes about 0.6% hydrogen chloride by weight, generally added as aqueous hydrochloric acid, but, if desired, the acidity of the ammonium chloride is sufficient to permit operation without added acid.

Cuprous chloride frequently contains cuprous oxide, cupric oxide and cupric chloride as impurities. The addition of a small amount of hydrochloric acid will convert the oxides to the respective chlorides. The cupric chloride is reduced to cuprous chloride by means of metallic copper. Higher acidity within narrow limits will not prevent satisfactory operation, but if more than 0.6% hydrogen chloride is added over the quantity necessary to convert all of the copper salts to cuprous chloride, the efficiency will decrease and if more than 5% is added, objectionable by-products are formed. The acid necessary for optimum production varies with the quality of the cuprous chloride. Best results are obtained if hydrogen chloride is added to the catalyst before charging with acetylene, until the point is reached where the pH suddenly drops from about 4 or 5 to a pH of less than 1 as measured with the glass electrode.

The sole purpose of added copper metal is to maintain the copper chloride in the cuprous state. If cupric salts are absent and the gases are kept free of oxidizing agents such as air, the presence or absence of metallic copper cannot be detected from the nature of the products obtained. As a safety measure, realizing the ease of oxidation of cuprous salts, the addition of copper powder in a quantity equal to about 4% of the weight of the catalyst is desirable. However, if preferred, the same end is accomplished by having copper present as one element of the reaction system which is in contact with the catalyst, as, for example, copper paddles in the agitator blades of the reactor which may be replaced as consumed.

The composition of this catalyst with respect to cuprous chloride and ammonium chloride should approach that dictated by the formula $Cu_2Cl_2.2NH_4Cl$.

Obviously, slight deviations from this ratio will not result in serious changes in efficiency, but essentially, it is preferred that the molar ratio of $NH_4Cl$ to $Cu_2Cl_2$ should be between 1.7 and 2.2 or substantially 2, as indicated by the formula, which corresponds to a weight ratio of 0.54. The concentration of this salt mixture in water should slightly exceed saturation so as to produce a small amount of solid phase in the solution at the operating temperature for best mechanical and chemical efficiency, though this is not essential. It has been found that the phase diagram of $Cu_2Cl_2$—$NH_4Cl$ and water show a composition which is saturated with respect to $Cu_2Cl_2.2NH_4Cl$ at about 33% water at 65° C. The saturation point varies with temperature. A saturated solution of this composition is a good catalyst and has the advantage of being entirely in the liquid phase before saturation with acetylene. It has been found, however, that the efficiency of the catalyst can be further improved by the use of a higher percentage of water. Thus, a particularly desirable catalyst possesses the composition cuprous chloride 37%, ammonium chloride 20% and water 43%. Contrary to the effect obtained by dilution of most solutions of a single solute in water, the dilution of this solution having two solutes ($NH_4Cl$ and $Cu_2Cl_2$) does not decrease saturation but increases it, and a small amount of solid phase appears. While solutions having a solid phase are especially desirable, the solid phase must be kept sufficiently small so as not to interfere with the circulation of the catalyst, i. e., the fluidity of the solution must be maintained. This requirement is further complicated by the fact that when the solution is charged with acetylene in the reaction chamber, the solubility of cuprous chloride is further decreased, thereby increasing the solid phase present.

Catalyst compositions within the close approximate range of the preferred catalyst have been tested, and for the purpose of a specific disclosure, the particularly effective range includes compositions containing a molecular ratio of $NH_4Cl$ to $Cu_2Cl_2$ of 1.7 to 2.2, which corresponds to a weight ratio of 0.46 to 0.59%, dissolved or suspended in 30 to 50% of water. As will be seen, these ranges include a narrow band of compositions containing solutions of cuprous and ammonium chlorides in approximately the molecular proportion of one of the former to two of the latter.

The following catalyst is particularly preferred for use at 65–75° C., water 41 to 45%, cuprous chloride 36–38%, ammonium chloride 19–21%, and, if desired, hydrogen chloride 0.6% added as aqueous acid. In this catalyst, at the lower temperature (65° C.) the water is essentially saturated when it contains 67% of cuprous and ammonium salts and 33% of water. The additional water, at the lower temperature limit will result in the presence of a small undissolved solid phase.

The inference is not to be drawn that the cuprous and ammonium salts must exist in solution as the compound $Cu_2Cl_2.2NH_4Cl$; it is merely stated that they should be present in solution in approximately the radio to form this compound. Though it is believed that the conditions specified favor a maximum concentration of this compound and that this fact is responsible for the efficiency of the catalyst, this is of purely theoretical significance and has no essential bearing on the quantities used or the results obtained.

In the discussion and appended claims referring to cuprous chloride, it is assumed that the molecular formula of cuprous chloride is $Cu_2Cl_2$ with a molecular weight of 198.1 and the proportions of materials have been given on this basis.

A method has been described for the polymerization of acetylene to nonbenzenoid polymers thereof in such manner as to increase the yield of monovinylacetylene and also to obtain a high polymer production. This method is carried out with a more efficient catalyst than those of the prior art. It is to be understood that suitable changes may be made in the details of the invention without departing from the spirit thereof and that such changes are intended to be included within the scope of the appended claims.

We claim:

1. A process of producing vinylacetylene, which comprises catalyzing the polymerization of acetylene with ammonium chloride and cuprous chloride in the molecular proportion $$\frac{\text{mols of ammonium chloride}}{\text{mols of cuprous chloride}}$$

equals between $$\frac{1.7}{1} \text{ and } \frac{2.2}{1}$$

2. A process of producing vinylacetylene, which comprises catalyzing the polymerization of acetylene with ammonium chloride and cuprous chloride in the molecular proportion $$\frac{\text{mols of ammonium chloride}}{\text{mols of cuprous chloride}}$$

equals between $$\frac{1.7}{1} \text{ and } \frac{2.2}{1}$$

and water in the amount of 30 to 50% by weight.

3. A process of producing vinylacetylene, which comprises catalyzing the polymerization of acetylene with ammonium chloride and cuprous chloride in the molecular proportion $$\frac{\text{mols of ammonium chloride}}{\text{mols of cuprous chloride}}$$

equals between $$\frac{1.7}{1} \text{ and } \frac{2.2}{1}$$

and about 0.6% by weight of hydrogen chloride, and water in the amount of 30 to 50% by weight.

4. A process of producing vinylacetylene, which comprises polymerizing acetylene at a temperature of about 65° to 75° C. in the presence of a catalyst which consists of 36 to 38% cuprous chloride, 19 to 21% ammonium chloride and 41 to 45% water, and removing the resulting vinylacetylene together with the unreacted acetylene from the catalyst before a substantial amount of divinylacetylene is formed.

5. A process of producing vinylacetylene, which comprises polymerizing acetylene at a temperature of about 65 to 75° C. in the presence of a catalyst which consists of 36 to 38% cuprous chloride, 19 to 21% ammonium chloride, 41 to 45% water, and about 0.6% hydrogen chloride, metallic copper being present in quantities sufficient to keep the copper chloride in the cuprous state, and removing the resulting vinylacetylene together with the unreacted acetylene from the catalyst before a substantial amount of divinylacetylene is formed.

6. A process of producing nonbenzenoid polymers of acetylene which comprises catalyzing the polymerization of acetylene with ammonium chloride and cuprous chloride in the molecular proportion of $$\frac{\text{mols of ammonium chloride}}{\text{mols of cuprous chloride}}$$

equals between $$\frac{1.7}{1} \text{ and } \frac{2.2}{1}$$

and water in the amount of 30 to 50% by weight.

ALBERT S. CARTER.
HOWARD W. STARKWEATHER.